US007166328B1

(12) United States Patent
Davies et al.

(10) Patent No.: US 7,166,328 B1
(45) Date of Patent: Jan. 23, 2007

(54) PRIMER COATING OF STEEL

(75) Inventors: Gerard Howard Davies, Newcastle-Upon-Tyne (GB); Paul Anthony Jackson, Hebburn (GB); Peter Joseph McCormack, Newcastle-Upon-Tyne (GB); Fiachra Banim, Balbriggan (IE)

(73) Assignee: International Coatings Ltd., London (GB)

( * ) Notice: Subject to any disclaimer, the term of this patent is extended or adjusted under 35 U.S.C. 154(b) by 0 days.

(21) Appl. No.: 09/936,794

(22) PCT Filed: Mar. 17, 2000

(86) PCT No.: PCT/EP00/02547

§ 371 (c)(1),
(2), (4) Date: Nov. 13, 2001

(87) PCT Pub. No.: WO00/55261

PCT Pub. Date: Sep. 21, 2000

(30) Foreign Application Priority Data

Mar. 18, 1999 (EP) .................. 99302127

(51) Int. Cl.
B05D 3/10 (2006.01)
(52) U.S. Cl. ............ 427/344; 427/397.7; 427/397.8
(58) Field of Classification Search ......... 427/343, 427/344, 397.7, 397.8
See application file for complete search history.

(56) References Cited

U.S. PATENT DOCUMENTS

| 2,998,328 A * | 8/1961 | Munger et al. ............ 427/344 |
| 3,130,061 A | 4/1964 | McMahon et al. .......... 106/84 |
| 3,180,746 A | 4/1965 | Patton et al. .............. 106/74 |
| 3,258,346 A * | 6/1966 | Fisher, Jr. ................. 106/14.14 |
| 3,320,082 A | 5/1967 | McMahon et al. ......... 106/287 |
| 3,345,194 A | 10/1967 | Weldes et al. ............. 106/287 |
| 3,392,039 A | 7/1968 | Cuneo Jr. ................. 106/84 |
| 3,522,066 A | 7/1970 | Forsyth ..................... 106/74 |
| 3,620,784 A | 11/1971 | Schutt ....................... 106/84 |
| 3,715,224 A | 2/1973 | Campbell .................. 106/74 |
| 3,721,574 A | 3/1973 | Schneider et al. ......... 106/74 |
| 3,793,055 A * | 2/1974 | Shodai et al. ............. 427/301 |
| 3,893,864 A | 7/1975 | Beers ........................ 106/1 |
| 3,977,888 A * | 8/1976 | Sano et al. ................. 427/344 |
| 4,006,030 A | 2/1977 | Yoshida et al. ............ 106/74 |
| 4,086,096 A | 4/1978 | McLeod .................... 106/1.17 |
| 4,162,169 A | 7/1979 | Schutt ....................... 106/74 |
| 4,230,496 A | 10/1980 | Falcone, Jr. et al. ..... 106/14.21 |
| 4,277,284 A | 7/1981 | Ginsberg et al. .......... 106/1.05 |
| 4,479,824 A | 10/1984 | Schutt ..................... 106/14.21 |
| RE32,250 E * | 9/1986 | Plueddemann ........... 252/389.1 |
| 4,888,056 A * | 12/1989 | van der Kolk et al. .... 106/1.17 |
| 4,902,442 A | 2/1990 | Garces .................... 252/313.2 |
| 4,917,960 A | 4/1990 | Hornberger et al. ..... 428/550 |
| 5,091,224 A * | 2/1992 | Kushida et al. .......... 427/419.4 |
| 5,221,497 A * | 6/1993 | Watanabe et al. ........ 516/83 |
| 5,246,488 A | 9/1993 | Tanaka et al. ............ 106/14.44 |
| 6,329,059 B1 | 12/2001 | Karchevsky et al. ..... 428/414 |
| 6,337,036 B1 | 1/2002 | Karchevsky et al. ..... 252/512 |
| 6,482,536 B1 | 11/2002 | Tanaka et al. ............ 428/626 |

FOREIGN PATENT DOCUMENTS

| GB | 997094 | 6/1965 |
| GB | 1007481 | 10/1965 |
| GB | 1226360 | 3/1971 |
| GB | 1485169 | 9/1977 |
| GB | 1541022 | 2/1979 |
| GB | 2 100 744 A | 1/1983 |
| JP | 55-100921 | 8/1980 |
| JP | 55-106271 | 8/1980 |
| JP | 6-200188 | 7/1994 |
| JP | 7-70476 | 3/1995 |
| KR | 8101300 | 10/1981 |
| WO | WO 88/06177 | 8/1988 |
| WO | 0 295 834 A1 | 12/1988 |
| WO | WO 98/58028 | 12/1998 |
| WO | WO 00/55261 | 9/2000 |
| WO | WO 02/22745 A1 | 3/2002 |

OTHER PUBLICATIONS

Definition of 'dispersion' from Hawley's Condensed Chemical Dictionary, 12th Edition, © 1998 by Van Nostrand Reinhold, p. 435.*
Definition of 'colloid chemistry' from Hawley's Condensed Chemical Dictionary, 12th Edition, © 1998 by Van Nostrand Reinhold pp. 300-301.*
Derwent Abstract No. 95-145041/19 abstracting JP 07070476-A, Mar. 1995.
Derwent Abstract No. 94-269638/33 abstracting JP 06200188-A, Jul. 1994.
Derwent Abstract No. 68747 C/39 abstracting JP 5 5106-271, Aug. 1980.

(Continued)

Primary Examiner—William Phillip Fletcher, III
(74) Attorney, Agent, or Firm—Lainie E. Parker

(57) ABSTRACT

A process for primer coating of steel which is intended to be fabricated and overcoated, in which process the steel is primer coated with a primer coating comprising a silica or silicate binder, wherein the binder comprises an aqueous silica sol or alkali metal silicate having a $SiO_2/M_2O$ mole ratio, where M represents total alkali metal and ammonium ions, of at least 6:1, and that after the primer coating has dried to the extent that it is touch dry it is treated with a solution which increases the film strength of the primer coating.

19 Claims, No Drawings

OTHER PUBLICATIONS

International Search Report Dated: Jun. 27, 2000 for PCT/EP00/02473.
Communication dated Sep. 3, 2004 referencing U.S. Appl. 10/380,129.
English language translation of Japanese Laid-Open No. 1976-73029; laid open date Jun. 24, 1976.
English language translation of Japanese Laid-Open No. 1976-79125; laid open date Jul. 9, 1976.
English language translation of Japanese Laid-Open No. 1980-100921; laid open date Aug. 1, 1980.
Derwent Abstract 66:56644 abstracting NL 6604385.
Derwent abstract 85:165408 abstracting JP 51073029.
Derwent abstract 85:181302 abstracting JP 51079125.
Derwent abstract 86:91877 abstracting JP 51150533.
Patent Abstracts of Japan abstracting JP 55-106271 (1980).
Patent Abstracts of Japan abstracting JP 06-200188 (1994).
Patent Abstracts of Japan abstracting JP 07-070476 (1995).
Abstract of KR8100661 from EPO on-line data base esp@cenet.
International Search Report for Application No. PCT/EP01/10552 dated Jan. 24, 2002.
Written Opinion of Application No. PCT/EP01/10552 dated Jul. 25, 2002.
Written Opinion of Application No. PCT/EP01/10552 dated Apr. 10, 2002.
International Preliminary Examination Report for Application No. PCT/EP01/10552 dated Jan. 24, 2002.
Iler, Ralph K., "Lithium Silicates," Chapter 2, pp. 145-150.
Iler, Ralph K., Table 4.3. Properties of Commercial Silica Sols Listed by Manufacturer, pp. 416-418.
Iler, Ralph K., "The Chemistry of Silica," John Wiley & Sons (1979) pp. 407-409.
Sears, Jr., G.W., "Determination of Specific Surface Area of Colloidal Silica by Titration with Sodium Hydroxide," Analytical Chem., vol. 28, No. 12 (1956), pp. 1981-1983.

* cited by examiner

PRIMER COATING OF STEEL

This application is the national phase of International Patent Application No. PCT/EP00/02547, filed on Mar. 17, 2000, and which claims priority of European Patent Application No. 99302127.8, filed Mar. 18, 1999.

This invention relates to a process for the primer coating of steel. In particular, it relates to the coating of semi-finished steel products which are subsequently to be fabricated by heat-intensive processes and overcoated. Such semi-finished steel products are used in the shipbuilding industry and for other large-scale structures such as oil production platforms and include steel plates, for example of thickness 6 to 75 mm, bars, girders and various steel sections used as stiffening members. The most important heat-intensive process is welding; substantially all such semi-finished steel products are welded. Other important heat-intensive processes are cutting, for example oxy-fuel cutting, plasma cutting or laser cutting, and heat fairing in which the steel is bent into shape while being heated. These steel products are often exposed to the weather during storage before construction and during construction, and they are generally coated with a coating called a "shop primer" or "pre-construction coating" to avoid corrosion of the steel occurring before the steel construction, e.g. ship, is given its full coating of anticorrosive paint, thereby avoiding the problem of having to coat over or remove steel corrosion products. In most big shipyards, the shop primer is applied as one of several treatments carried out on a production line in which the steel is for example preheated, shot- or grit-blasted to remove millscale and corrosion products, shop primed and passed through a drying booth. The shop primer can alternatively be applied by a trade coater or steel supplier before the steel is delivered to the shipyard or other construction site.

Although the main purpose of the shop primer is to provide temporary corrosion protection during construction, it is preferred by shipbuilders that the shop primer does not need to be removed but can remain on the steel during and after fabrication. Steel coated with shop primer thus needs to be weldable without removal of shop primer and to be overcoatable with the types of protective anti-corrosive coatings generally used on ships and other steel constructions, with good adhesion between the primer and the subsequently applied coating. The shop primed steel should preferably be weldable without significant detrimental effect on the quality of the weld or on the speed of the welding process and should be sufficiently resistant to heat that the shop primer retains its anticorrosive properties in areas heated during fairing or during welding of the opposite face of the steel.

Commercially successful shop primers available today are solvent borne coatings based on prehydrolysed tetraethyl orthosilicate binders and zinc powder. Such coatings contain a large proportion of volatile organic solvent, typically about 650 grams per liter, to stabilize the paint binder and to enable the product to be applied as a thin film, typically about 20 microns thick. Release of volatile organic solvent can be damaging to the environment and is regulated by legislation in many countries. There is a need for a shop primer which releases no, or much less, volatile organic solvent. Examples of such coatings are described in U.S. Pat. No. 4,888,056 and JP-A-7-70476.

JP-A-6-200188 is concerned with shop primer coatings and mentions the possibility of using an aqueous alkali silicate salt type binder. Coatings comprising an aqueous alkali metal silicate and zinc powder are also proposed in GB-A-1226360, GB-A-1007481, GB-A-997094, U.S. Pat. No. 4,230,496 and JP-A-55-106271. Alkali silicate binders for anticorrosive coatings are also mentioned in U.S. Pat. No. 3,522,066, U.S. Pat. No. 3,620,784, U.S. Pat. No. 4,162,169 and U.S. Pat. No. 4,479,824. We have found that primer coatings based on an aqueous alkali silicate binder containing zinc powder can give adequate corrosion protection and allow the steel surfaces they cover to be welded but give rise to problems when overcoated. The aqueous silicates contain a large quantity of alkali metal cations which are required to keep the silicate in aqueous solution and these ions are still present in the coating after the coating has dried. We have found that, if primer coatings having these large quantities of alkali metal ions are overcoated with any conventional organic coating and then immersed in water, blistering (local delamination of the coating) occurs. We have performed tests that show that this problem can be reduced if the coating is weathered outside for some time after application of the shop primer or washed prior to overcoating. However, these processes are not compatible with use in todays high productivity shipyards.

Aqueous silica sols having very low alkali metal ion content are available commercially but coatings based on such sols have very poor (initial) film strength in terms of adhesion, cohesion, hardness, and resistance to abrasion and water. These poor physical properties of the coating make the coating susceptible to damage during handling or further processing. This brings the potential requirement for significant coating repair with major cost implications. Suggested improvements to silica sol coatings are described in U.S. Pat. No. 3,320,082, which adds a water-immiscible organic amine, GB-A-1541022, which adds a water-soluble acrylamide polymer and GB-A-1485169, which adds a quaternary ammonium or alkali metal silicate, but such coatings have not achieved physical properties similar to those of coatings based on alkali metal silicates. Coatings based on silica sols show low levels of blistering when overcoated/immersed. Although the water soluble salt content and osmotic pressure is low, blistering can still occur as the coating exhibits little resistance to blister initiation/growth due to its poor physical properties.

There is a need for a water-based shop primer of low alkali metal ion content which has improved adhesion to substrates and film strength in terms of the properties discussed above to resist blister initiation and growth. Further, there is a need for a blister-free water-based shop primer showing faster development of the physical properties of the coating after application of the shop primer to enable the handling and further processing of the substrate without the risk of damaging the coating.

SUMMARY OF THE INVENTION

The process according to the present invention for primer coating of steel which is intended to be fabricated and overcoated, provides a solution to the above-mentioned problems/disadvantages. The process according to the present invention for the primer coating of the steel with a primer coating comprising silica or silicate binder, is characterized in that the binder comprises an aqueous silica sol or alkali metal silicate having a $SiO_2/M_2O$ mole ratio, where M represents total alkali metal and ammonium ions, of at least 6:1, and that after the primer coating has dried to the extent that it is touch dry it is treated with a film strengthening solution.

DETAILED DESCRIPTION OF THE INVENTION

For the purpose of the present invention, a film strengthening solution is a solution that enhances the film strength of a primer coating and/or accelerates the development of the film strength with time.

The binder is most preferably based on an aqueous silica sol. Such sols are available from Akzo Nobel under the Registered Trademark "Bindzil" or from DuPont under the Registered Trademark "Ludox", although the literature concerning them emphasizes that conventional grades of colloidal silica are not good film formers. Various grades of sol are available having various particle sizes of the colloidal silica and containing various stabilizers. The particle size of the colloidal silica can for example be in the range 3 to 100 nm; particle sizes towards the lower end of this range, for example 5 to 10 nm, are preferred. The silica sol preferably has a $SiO_2/M_2O$ mole ratio of at least 25:1, more preferably at least 50:1 and may have a $SiO_2/M_2O$ mole ratio of 200:1 or more. Further, it is possible to use a blend of two or more silica sols having a different $SiO_2/M_2O$ mole ratio, wherein the $SiO_2/M_2O$ mole ratio of the blend is at least 25:1. The sol can be stabilized by alkali, for example sodium, potassium, or lithium hydroxide or quaternary ammonium hydroxide, or by a water-soluble organic amine such as alkanolamine. The coating composition should preferably be substantially free of any ammonium stabilized silica sol, since the presence of an ammonium stabilized sol could result in gelling of the composition, in particular when the binder mainly consists of ammonium stabilized silica sol and the coating composition also contains zinc powder.

The silica sol can be blended with an alkali metal silicate, for example lithium silicate, sodium-lithium silicate or potassium silicate, or with ammonium silicate or a quaternary ammonium silicate. Other examples of suitable sol-silicate blends or mixtures can be found in U.S. Pat. No. 4,902,442. The addition of an alkali metal or ammonium silicate may improve the initial film-forming properties of the silica sol, but the amount of alkali metal silicate should be low enough to keep the $SiO_2/M_2O$ mole ratio of the binder sol at least 6:1, preferably at least 8:1 and most preferably above 15:1.

The silica sol can alternatively or additionally contain a dissolved or dispersed organic resin. The organic resin is preferably a latex, for example a styrene butadiene copolymer latex, a styrene acrylic copolymer latex, a vinyl acetate ethylene copolymer latex, a polyvinyl butyral dispersion, a silicone/siloxane dispersion, or an acrylic based latex dispersion. Examples of suitable latex dispersions that can be used include XZ94770 and XZ94755 (both ex. Dow Chemicals), Airflex® 500, Airflex® EP3333 DEV, Airflex® CEF 52, and Flexcryl® SAF34 (all ex. Air Products), Primal® E-330DF and Primal® MV23 LO (both ex. Rohm and Haas), and Silres® MP42 E, Silres® M50E, and SLM 43164 (all ex. Wacker Chemicals). Water soluble polymers such as acrylamide polymers can be used but are less preferred. The organic resin is preferably used at up to 35% by weight, preferably 1–20% by weight, based on silica. Higher amounts may cause weld porosity during subsequent welding. It was found that the addition of an organic resin improves the adhesion/cohesion as measured in the cross hatch test.

The silica sol can alternatively contain a silane coupling agent which contains alkoxysilane groups and an organic moiety containing a functional group such as amino, epoxide or isocyanate group. The silane coupling agent is preferably an aminosilane such as gamma-aminopropyl triethoxy silane or gamma-aminopropyl trimethoxy silane, or a partial hydrolysate thereof, although an epoxy silane such as gamma-glycidoxypropyl trimethoxy silane can also be used. The silane coupling agent is preferably present at up to 30% by weight, for example 1–20% by weight, based on silica.

The binder of the primer coating can alternatively comprise an aqueous solution of an alkali metal or ammonium silicate stabilized by a siliconate substituted by at least one anionic group of lower pKa than silicic acid such as a carboxylate or sulphonate group. Such a binder is preferably a solution having a $SiO_2/M_2O$ mole ratio in the range 8:1 to 30:1 and a pH of 7 to 10.5 prepared by lowering the pH of a solution of silicate and siliconate by cation exchange. For example the siliconate can be added at relatively low levels, for example at a molar ratio of 1:2 to 1:20, to a conventional 3:9:1 $SiO_2/K_2O$ alkali silicate. The solids may then be reduced to improve ease of processing and to further improve stability. At this stage the solution has a pH of 12–12.5. The solution is ion exchanged using a standard ion exchange resin. $K^+$ ions are replaced with $H^+$ reducing both the alkali content of the binder and the pH. Without the presence of the siliconate the silicate would gel on reducing the pH. Clear, stable solutions with pH's as low as 8 have been obtained. The resultant binder has an $SiO_2/K_2O$ mole ratio typically in the range 8–20:1 and can be concentrated if desired to increase the solids. The binder is a clear, stable solution and is stable in the presence of zinc but coatings based on these ion exchanged binders have relatively poor film strength, compared to coatings based on alkali silicate binders.

The primer coating preferably contains zinc powder, which is preferably of volume averaged mean particle size 2 to 12 microns and most preferably the product that is sold commercially as zinc dust having a mean particle size of 2 to 8 microns. The zinc powder protects the steel by a galvanic mechanism and may also form a protective layer of zinc corrosion products which enhances the corrosion protection given by the coating. All or part of the zinc powder can be replaced by a zinc alloy. The amount of zinc powder and/or alloy in the coating is generally at least 10% and may be up to 90% by volume of the coating, on a dry film basis. The zinc powder and/or alloy can be substantially the whole of the pigmentation of the coating or can for example comprise up to 70%, for example 25 to 55%, by volume of the coating, on a dry film basis with the coating also containing an auxiliary corrosion inhibitor, which can for example be a molybdate, phosphate, tungstate or vanadate, as described in U.S. Pat. No. 5,246,488 and/or a filler such as silica, calcined clay, alumina silicate, talc, barytes or mica. However, other pigments can be used in conjunction with zinc-based pigments. Examples of these other non-zinc pigments include conductive extenders such as di-iron phoshide (Ferrophos®), micaceous iron oxide etc. Use of these conductive non-zinc pigments may allow a reduction in the level of zinc while maintaining effective corrosion protection. To obtain optimum coating properties, extenders with a mean particle size below 3 μm, preferably below 2 μm, and small size pigments should be used. The pigment volume concentration of the primer coating is preferably at least equal to the critical pigment volume concentration, as is usual for zinc silicate primers, for example 1.0 to 1.5 times the critical pigment volume concentration. The pigment volume concentration (PVC) is the volume percent of pigment in the dry paint film. The critical pigment volume concentration (CPVC) is normally defined as the pigment volume concentration where there is just sufficient binder to provide a complete adsorbed layer of binder on the pigment surfaces and to fill all the interstices between the particles in a close-packed system. The critical pigment volume concentration can be determined by wetting out dry pigment with just sufficient linseed oil to form a coherent mass. This method yields a value known as the "oil absorption" from which the critical pigment volume concentration can be calculated. The method for determining oil absorption is described in British Standard 3483 (BS3483).

The solids content of the primer coating is generally at least 15% by volume and preferably in the range 20 to 35% by volume. The volume solids content is the theoretical value calculated on basis of all components that are present in the coating composition. The coating preferably has a viscosity such that it can easily be applied by conventional coating applicators such as spray, particularly airless spray or high volume low pressure (HVLP) spray applicators, to give a coating of dry film thickness less than 40 microns, preferably between 12 and 25 to 30 microns. Optionally, the coating composition may comprise further additives well known to the skilled person, like, e.g., rheology control agents (organo clays, xanthanum gum, cellulose thickeners etc.), defoamers (in particular when latex modifiers are present), and pot-life extenders, such as chromates (for example sodium dichromate). If no pot-life extenders are present, the coating composition normally has a pot-life between 2–4 hours. Usually it is sufficient to add only a small quantity (0.0125–0.025 wt % based on liquid paint) of sodium dichromate to obtain a pot life of greater than 24 hours. Higher levels normally lead to poor properties of the coating. Normally the coating system is provided as a two (or more) component system. It is possible to prepare the coating composition just prior to application of the coating, for example by adding and thorough mixing of all components of the coating composition shortly before application. Such process can also be referred to as on-line mixing of the components that are present in the coating composition. This process is in particular suited for coating compositions that have a limited pot-life.

The primer coating is dried to the extent that it is touch dry before it is treated with the film strengthening solution. The time to touch dry is generally about 10 to 15 minutes at ambient temperatures of 15 to 20° C. or 3 to 4 minutes at 40° C. for a 15–20 μm dry film thickness (dft) coating. Drying time is also dependent on air flow and film thickness. At 35° C. and 0.5 m/s air flow, the drying time for a 20 μm dry film thickness coating is approximately 2 minutes. This time can be further reduced by increasing the air temperature. In general, the drying time can be reduced by either increasing the substrate temperature, increasing the air temperature, using an air-flow, or by any combination thereof. It is preferred to carry out drying of the primer coating at 10–60° C., preferably 25–50° C. in a forced air-flow, preferably in an air-flow of at least 0.1 m/s, especially if primer coating, drying and application of the film strengthening solution are to be carried out in an on-line process. Achieving fast drying is very important for the on-line application in shipyards or steel mills. Application of the treatment solution before the primer is touch dry does not give film strengthening.

The solution which increases the film strength of the primer coating can in general be an aqueous solution of an inorganic salt or a solution of material having reactive silicon-containing groups. The increase in film strength can be detected by a significant increase in hardness, abrasion resistance and usually adhesion. Hardness can be measured in pencil hardness test British Standard 3900, part E19 (1999) (hardness of pencil required to gouge the coating). Abrasion resistance can be measured using a double rub test which automatically rubs the coating and can be carried out dry or wet with water. While a significant increase in either dry or wet abrasion resistance would be regarded as an increase in film strength of the primer coating, we have found that the treatment according to the invention generally increases both dry and wet abrasion resistance. Adhesion can be measured by a cross-hatch test as described in British Standard 3900, part E6 (1992).

The amount of film strengthening solution applied to the primer coating is generally in the range 0.005–0.2, preferably 0.01–0.08 liters per square meter of primer coated surface (L/m$^2$) for coatings applied at standard dry film thickness (15–20 μm). Such an amount of solution can conveniently be applied by spraying. Needless to say that the concentration or the volume of the post-treatment solution should be increased if the coating is over-applied, i.e. at a dry film thickness >20 μm. Washing has previously been suggested as a post-treatment for zinc silicate coatings based on an alkali metal silicate binder, but this has involved application of larger amounts of water to wash soluble alkali metal salts from coatings having $SiO_2/M_2O$ ratios of about 3:1 to 4:1. Spray application of an equivalent amount of water alone or passing the primer through a steam chamber on line at typical line speeds (i.e. an exposure time <2 min.) does not give substantial film strengthening.

While we do not wish to be bound by any theory explaining the film strengthening, it appears that when the treatment solution is an aqueous inorganic salt solution, either silica dissolution and reprecipitation takes place or the salt acts as a reinforcing agent between the sol particles. When the treatment solution contains reactive silica species, these can be deposited between the silica sol particles to improve bonding of the sol particles. We have found that the same strengthening materials, when added to the primer coating composition at or before application to the substrate, do not strengthen the primer coating film formed.

When the film strengthening solution is an aqueous solution of an inorganic salt, it generally has a concentration of at least 0.01M and preferably at least 0.03M. The concentration of the inorganic salt solution can be up to 0.5M or 1M or even higher. The inorganic salt can be the salt of a monovalent cation such as an alkali metal or ammonium salt, of a divalent cation such as zinc, magnesium, calcium, copper (II) or iron (II), of a trivalent cation such as aluminium or cerium (III), or of a tetravalent cations such as cerium (IV), and of a monovalent anion such as a halide, for example fluoride, chloride or bromide, or nitrate, or a polyvalent anion such as sulphate or phosphate. Mixtures of the above-mentioned salts can also be used. Examples of inorganic salt solutions which have been found effective are magnesium sulphate, zinc sulphate, potassium sulphate, aluminium sulphate, iron sulphate, cerium(IV)sulphate, copper sulphate, sodium chloride and potassium chloride, although chlorides may not be preferred because of their tendency to promote corrosion. The concentration of the inorganic salt solution in weight terms is preferably in the range 0.5–20% by weight.

One example of a material having active silicon-containing groups is a silicate. The film strengthening solution can for example be an alkali metal silicate solution, for example potassium silicate or lithium silicate, or an ammonium silicate solution or can be an alkali metal siliconate, for example an alkylsiliconate solution. The preferred concentration of such a solution is in the range 0.5–20% by weight.

When the film strengthening solution is a solution of an inorganic salt or alkali metal silicate, the added material will increase the salt content of the zinc silicate primer coating. This will tend to increase the osmotic driving force when the coating is overcoated and thus the possibility of osmotic blistering when the coated substrate is immersed. The amount of inorganic salt of alkali metal silicate applied is preferably low enough so that the $SiO_2/M_2O$ mole ratio of the primer coating binder is kept above 6:1, preferably above 8:1 and most preferably above 10:1. To achieve this, the amount of inorganic salt or alkali metal silicate applied in the film strengthening solution is preferably less than 10 g/m$^2$ on a dry weight basis, most preferably less than 5 g/m$^2$, for a coating with a dry film thickness of 15–20 μm.

An alternative example of a material having reactive silicon-containing groups is an alkoxysilane or an acyloxysilane, for example acetoxysilane. This can for example be a tetraalkoxysilane (alkyl orthosilicate) such as tetraethoxysilane or tetraisopropoxysilane, or a trialkoxysilane such as methyl trimethoxysilane (MTMS, ex Aldrich) or bistrimethoxysilane ethane. The alkoxysilane may contain additional functional groups, for example a trialkoxysilane can have the formula $(RSi(OR^1)_3)$ where each $R^1$ group is 1–3C alkyl and R is an alkyl or aryl group substituted by an amino, alkylamino, dialkylamino, amide, halogen, carbamate, epoxide, isocyanate, azindine, sulphonate, carboxylate, phosphate or hydroxyl group. Preferred examples are aminosilanes such as triethoxy silylpropylamine (Aminosilane A1100 ex. Witco), trimethoxy silylpropylamine (Aminosilane A1110 ex. Witco), trimethoxy silylpropylethylenediamine (Aminosilane A1120 ex. Witco), trimethoxy silypropyldiethylenetriamine (Aminosilane A1130 ex. Witco) or bistrimethoxysilyl propylethylene diamine. Further, the alkoxysilane can be a bis(trialkoxysilane), for example an alkylene or polydimethylsilane chain tipped with —SiOR'$_3$ groups. The alkoxysilane can be at least partially hydrolyzed, for example a partially hydrolyzed tetraalkoxysilane or a hydrolyzed alkyl trialkoxy silane or aminoalkyl trialkoxy silane, can be used. The alkoxysilane is preferably applied from aqueous solution, although the aqueous solution can contain a water-miscible organic solvent, for example an alcohol such as ethanol. Further it was found that also orthosilicates are very effective property-enhancers in the post-treatment process. Aqueous solutions of tetramethylorthosilicate (TMOS) and tetraethylorthosilicate (TEOS) are effective post-treatment agents. Better results are obtained if TMOS or TEOS are hydrolysed at pH 1–2. At this pH the pot-life of the post treatment solution can exceed 7 days. The concentration of alkoxysilane or orthosilicates in the treatment solution is preferably in the range 1–25% by weight. The use of alkoxysilanes and/or orthosilicates in the post-treatment solution is preferably in the range 1–25% by weight. The use of alkoxysilanes and/or orthosilicates in the post-treatment solution is preferred since these compounds add virtually zero level of water soluble salts to the shop-primer.

The application of the treatment solution, and preferably also the drying of the treated primer coating until the coating is again touch dry, can be carried out in an on-line process following primer coating of the steel and drying of the primer coating until it is touch dry. The amount of film strengthening solution applied is preferably 0.005–0.2 L/m$^2$ of primer coated surface, most preferably 0.08 L/m$^2$ or less if the coating is treated and dried on-line for a coating with a dry film thickness of 15–20 μm. The drying time for this coating treated with such amount of film strengthening solution is generally about 5 to 10 minutes at 15–20° C. or about 1.5 to 2 minutes at 40° C. The drying time can be further reduced by placing the primed substrate in an air flow. In general, the drying time can be reduced by either increasing the substrate temperature, increasing the air temperature, using an air-flow, or by any combination thereof.

The treatment solution is preferably applied and dried at a temperature in the range 10–60° C., preferably 25–50° C. in a forced air-flow, preferably in an air-flow of at least 0.1 m/s. The treatment solution can be applied by standard spray application equipment, for example airless spray or HVLP spray, or by a simple atomizer spray, simply by mounting a second spray gun further down the shop primer line from the spray gun applying the primer. Alternatively, the solution can be applied by using a mist coating application technique. The treatment solution can be applied to both sides of a substrate, for example to both sides of a steel plate for use in shipbuilding, whatever the orientation of the substrate; the volume of solution required to strengthen the film are such that the solution can be applied to the underside of a plate without sagging or dripping. Other methods of application such as application by roller are possible but are not preferred. The treated primer coating only needs to be allowed to dry on the substrate and does not need any subsequent washing or heating; once the treated primer is dry the coated product can be handled normally.

The treatment process according to the invention increases the hardness, cohesion and abrasion resistance of the shop primer without introducing the disadvantage of blistering when overcoated. Further, the treatment process accelerates the development of these properties. This improves the resistance to damage during handling and fabrication in a ship yard or steel mill. In addition to these benefits, the post-treated shop primed substrate shows the performance characteristics required in the shop primed market, viz. corrosion resistance of 6 months on outdoor exposure, excellent welding/cutting characteristics and overcoatability with a wide range of primer coatings with no blistering or pinholing. For example when a zinc-filled silica sol coating is post-treated with a film strength enhancing solution, the dry abrasion resistance is increased at least fivefold and the wet abrasion resistance usually tenfold or more. The pencil hardness typically changes from 2B to H or harder. The $SiO_2/M_2O$ mole ratio of the primer coating may for example be reduced from 50–200 to 15–35 if the film strengthening solution applied is an inorganic salt solution or alkali metal silicate solution, but at normal dry film thickness of 15–20 μm for shop primer coatings this is still above the level at which significant blistering occurs. The $SiO_2/M_2O$ mole ratio can be maintained at an even higher level if the film strengthening solution is an alkoxysilane solution. The treated primer coatings can be overcoated with an amine-cured epoxy resin coating, or any other heavy duty coating such as a polyurethane, at a film thickness of 100 μm or 200 μm and after being allowed to cure for 7 days can be immersed in fresh or sea water for over 6 months (longest test period thus far) at 40° C. without blistering.

The invention will be elucidated with reference to the following examples. These are intended to illustrate the invention but are not to be construed as limiting in any manner the scope thereof.

The compounds used as starting material in the examples have the following origin:

| | |
|---|---|
| Ludox ® SM | a silica sol of concentration 30% by weight, particle size 7 nm, $SiO_2/Na_2O$ mole ratio 50:1, ex DuPont |
| XZ 94770 | a styrene/butadiene organic latex of 50 vol. % solids, ex. Dow Chemicals. |
| Huber 90C | a calcined aluminium silicate extender pigment of 0.7 μm mean particle size, ex JM Huber/Marlow Chemicals |
| Satintone ® W | a calcined aluminium silicate extender pigment of 1.4 μm mean particle size, ex Lawrence Industries |
| Zinc dust | a 7 μm mean particle size metal powder, ex. Trident Alloys |

Examples 1 to 7

A primer coating of solids concentration 25% by volume was prepared from the following ingredients. The primer coating had a pigment volume concentration of 74.6%, which is 1.3 times the critical pigment volume concentration ($\lambda=1.3$).

| Component | % by weight |
|---|---|
| Ludox | 25.8 |
| water | 20.4 |
| Bentonite clay thixotrope | 0.2 |
| Zinc dust | 45.5 |
| Satintone | 8.1 |

A primer was prepared by mixing the silica sol with water and thixotrope and the resulting binder was mixed with the pigments just before application to the steel, as is usual with zinc silicate coatings. The obtained primer coating was applied to 15 cm×10 cm steel panels at a dry film thickness of 15–20 μm. The primer was allowed to dry overnight under ambient conditions (20° C., 35% RH).

The panels were then sprayed with various film strengthening solutions. The inorganic salts had a concentration of 5% by weight and the silicon-containing solutions had a concentration of 8% by weight and 0.2 g of the solution was sprayed on each panel. The treated panels were allowed to dry at 15–20° C./35% RH and were tested after 24 hours for pencil hardness (British Standard 3900, part E19=BS 3900: E19), cross-hatch adhesion (British Standard 3900, part E6=BS 3900:E6) on a scale rated from 0 (no adhesion) to 5 (100% adhesion) and abrasion resistance (double rub test). In the double rub test the treated surface is wetted with a couple of drops of water (if doing wet double rubs) then rubbed with a cotton wool swab using light pressure. One pass to and fro is a double rub. The results are expressed as the number of double rubs till removal of the coating. If the coating survives 100 double rubs the final dry film thickness (dft) is compared to the initial value. If the dry film thickness is reduced by more than 25% the result is expressed as >100. If the dry film thickness is reduced by less than 25% the result is expressed as >>100. The same tests were carried out in comparative experiments on (C1) an untreated primer coating and (C2) a primer coating which had been sprayed with 0.2 g water. The results are shown in Table 1 below.

TABLE 1

| | | Mechanical properties of treated coatings | | |
|---|---|---|---|---|
| Example No | Additive and concentration | Double rubs Dry/Wet | Pencil Hardness | Cross-hatch Adhesion |
| C1 | Control | 22/8 | 2B | 0 |
| C2 | Water (sprayed) | 35/12 | B | 1 |
| 1 | 5% Potassium chloride | >>100/>>100 | 6–9H | 2–3 |
| 2 | 5% Potassium sulphate | >>100/50 | H–2H | 3 |
| 3 | 5% Zinc sulphate | >>100/50–100 | 6H | 4 |
| 4 | 8% Potassium silicate | >>100/>>100 | 5H | 3–4 |
| 5 | 8% TEOS/water (pH = 2) | >>100/50 | 5H | 1 |
| 6 | 8% TEOS/alcohol | >>100/100 | HB | 1 |
| 7 | 5% Aminosilane A1110/water | >>100/>>100 | 6H | 2–3 |

The potassium silicate solution of Example 4 had an $SiO_2/K_2O$ mole ratio of 3.9:1.
Example 5 used tetraethyl orthosilicate (TEOS) partially hydrolyzed in water at pH = 2.
Example 6 used TEOS solved in ethanol.

Examples 8 and 9

Primer coatings were prepared using the formulation of Example 1 but with the following silica sols used in place of Ludox SM:

Example 8—Ludox® AM (ex DuPont), a sol of particle size 12 nm and $SiO_2/Na_2O$ ratio 125:1.

Example 9—Bindzil® 5080 (ex Akzo Nobel/Eka Chemicals), a polydisperse sol of average particle size 40 nm and $SiO_2/Na_2O$ ratio 225:1.

The water content in the compositions of examples 8 and 9 was adjusted in such a way to have the same silica solid content in the dry film as found in example 1.

Example 10

A primer coating was prepared based on Ludox SM silica sol and zinc but having the formulation shown below. The coating had a pigment volume concentration of 81% ($\lambda=1.3$)

| Component | % by weight |
|---|---|
| Ludox SM sol (30 wt. % solids) | 19.0 |
| Water | 24.7 |
| Bentonite clay thixotrope | 0.2 |
| Zinc dust | 45.0 |
| Satintone pigment | 3.4 |
| "Molywhite" molybdate pigment | 7.7 |

Example 11

A primer coating was prepared using the ingredients of Example 1 but with the amount of each non-zinc pigment component proportionally reduced so that the pigment volume concentration was equal to the critical pigment volume concentration.

The coatings of Examples 8 to 11 were applied to steel panels and allowed to dry as described in Example 1. The panels were then sprayed with 0.2 g of a 8% by weight potassium silicate solution as used in Example 4. The panels were tested as described in Example 1, except that no comparison was made with a primed panel sprayed with water. The results are shown in Table 1a and 2b below.

TABLE 2a

| Example No. | Sol/Formulation | Mechanical properties of untreated coatings | | |
|---|---|---|---|---|
| | | Double rub Dry/Wet | Pencil Hardness | Cross-hatch Adhesion |
| 8 | Ludox AM/$\lambda$ = 1.3 | 30/10 | 2B | 2 |
| 9 | Bindzil 5080/$\lambda$ = 1.3 | 4/1 | H | 3 |
| 10 | Ludox SM/$\lambda$ = 1.3 | 10/4 | 4B | 1 |
| 11 | Ludox SM/$\lambda$ = 1.0 | 20/5 | B | 0 |

TABLE 2b

| Example No. | Sol/Formulation | Mechanical properties of treated coatings | | |
|---|---|---|---|---|
| | | Double rub Dry/Wet | Pencil Hardness | Cross-hatch Adhesion |
| 8 | Ludox AM/$\lambda$ = 1.3 | 100/75–100 | H–3H | 2 |
| 9 | Bindzil 5080/$\lambda$ = 1.3 | 100/40–100 | 4H | 3–4 |
| 10 | Ludox SM/$\lambda$ = 1.3 | >>100/80–100 | 5H | 3 |
| 11 | Ludox SM/$\lambda$ = 1.0 | >>100/80 | HB | 0 |

Examples 4, 8, 9, and 10 show that film strengthening is achieved for a variety of sols and coating compositions, with better treated coatings obtained from sols of smaller particle size.

Examples 4 and 11 show that best results are achieved at a higher than critical pigment volume concentration.

Examples 12 to 15

The coatings of Examples 8 to 11 were applied to steel panels and allowed to dry as described in Example 1. The panels were then sprayed with 0.2 g of a 5% by weight potassium chloride solution. The panels were tested as described in Example 1, except that no comparison was done with a primed panel sprayed with water. The results are shown in Table 3.

TABLE 3

| Example No. | Treatment | Mechanical properties | | |
|---|---|---|---|---|
| | | Double rubs Dry/Wet | Pencil Hardness | Cross-hatch Adhesion |
| 12 | 8 + 5% potassium chloride | 100/50 | 5H | 3 |
| 13 | 9 + 5% potassium chloride | 100/10 | 3H | 3 |
| 14 | 10 + 5% potassium chloride | >>100/20–30 | 2H | 2 |
| 15 | 11 + 5% potassium chloride | >>100/50 | HB | 0–1 |

Examples 16 to 19

The process of Example 4 was repeated using different concentrations of potassium silicate solution. The panels were tested after drying and the results are shown in Table 4 below. These results show that a strengthening effect is achieved even using potassium silicate at a concentration of 0.5% by weight, the effect increasing with concentration up to 4%.

TABLE 4

| Example No | Potassium silicate concentration | Mechanical properties of treated coatings | | |
|---|---|---|---|---|
| | | Double rub Dry/Wet | Pencil Hardness | Cross-hatch Adhesion |
| 4 | 8 wt. % | >>100/>>100 | 5H | 3–4 |
| 16 | 4 wt. % | >>100/>>100 | 5H | 3–4 |
| 17 | 2 wt. % | >>100/60 | 6H | 3–4 |
| 18 | 1 wt. % | >>100/40 | 2H | 4 |
| 19 | 0.5 wt. % | 100/20 | HB | 4 |

Example 20

To simulate a more practical application of the film strengthening solution, Example 4 was repeated with application of the potassium silicate after only 10 minutes or 30 minutes drying of the primer coating at 20° C.

The drying time of 10 minutes at 20° C. was sufficient for some panels to become touch dry but others were still partly wet (that is, they had no surface water but were wet to the touch over at least part of the panel). All panels dried for 30 minutes at 20° C. were touch dry. On testing as described in Examples 1, markedly different results were obtained depending on whether the primer coated panel was touch dry when the potassium silicate was applied, as shown in Table 5 below.

Example 21

Example 20 was repeated but with drying of the primer coating at 40° C. without additional air flow. The primer was observed to become touch dry in 3 or 4 minutes. Panels dried at 40° C. for 4 minutes were tested as described in Example 1 and the results are included in Table 5 below.

TABLE 5

| Example No | Drying time and temperature | Appearance on applying additive | Double Rub Dry/Wet | Pencil Hardness | Cross-hatch Adhesion |
|---|---|---|---|---|---|
| 20 | 10 min at 20° C. | Partly wet | 13/4 | 2B | 0 |
|  | 10 min at 20° C. | Dry | >>100/>>100 | 6H | 3–4 |
|  | 30 min at 20° C. | Totally dry | >>100/>>100 | 6H | 3–4 |
| 21 | 4 min at 40° C. | Totally dry | >>100/>>100 | 3H | 4 |

Examples 22 and 23

A hybrid silica sol organic resin primer coating was prepared from the following ingredients and applied to steel panels as described in Example 1.

| Component | Amount (% by weight) |
|---|---|
| Ludox SM sol (30 wt % solids) | 19.8 |
| Dow 94770 Styrene butadiene latex (50% solids) | 3.6 |
| Water | 23.0 |
| Bentonite clay thixotrope | 0.2 |
| Satintone | 8.1 |
| Zinc | 45.5 |

Panels were sprayed with 0.2 g of an 8% by weight potassium silicate solution (Example 22) or of a 5% by weight aqueous aminosilane solution (Example 23) and allowed to dry and tested as described in Example 1. The results obtained are shown in Table 6 below:

TABLE 6

| | | Mechanical properties | | |
|---|---|---|---|---|
| Example No. | Treatment | Double rubs Dry/Wet | Pencil Hardness | Cross-hatch Adhesion |
| (Comparison) | Untreated | >>100/20–60 | B | 4 |
| 22 | 8% potassium silicate | >>100/>>100 | 6H | 4 |
| 23 | 5% amino silane (A1110) | >>100/>100 | 2H | 5 |

Examples 24 to 26

To illustrate the effect of different drying conditions before treatment with a film strengthening solution, the shop primer coating system described in Example 1 was applied to a panel as described in Example 1 and post-treated with 0.3 g of a 5% solution of zinc sulphate under different drying conditions (temperature, relative humidity, air-flow). The mechanical properties were measured one day after application of the coating. The results are shown in Table 7.

TABLE 7

| | | | Mechanical properties | | |
|---|---|---|---|---|---|
| Example No. | Drying conditions | Total drying time(s) | Double rubs Dry/Wet | Pencil Hardness | Cross-hatch Adhesion |
| 24 | 20° C./ 30% RH | 1200 | >>100/50–100 | 6H | 4 |

TABLE 7-continued

| | | | Mechanical properties | | |
|---|---|---|---|---|---|
| Example No. | Drying conditions | Total drying time(s) | Double rubs Dry/Wet | Pencil Hardness | Cross-hatch Adhesion |
| 25 | 30° C./ 30% RH/ 0.5 m/s | 240 | >>100/>>100 | 5H | 4 |
| 26 | Heat gun | 130 | >>100/>>100 | 6H | 3 |

Examples 27 to 31

To illustrate the effect of fast development of mechanical properties, several coating compositions were prepared that were post-treated with different solutions.

Example 27

A primer coating of solids concentration 28% by volume was prepared from the following ingredients. The primer coating had a pigment volume concentration of 74.6%, which is 1.3 times the critical pigment volume concentration ($\lambda=1.3$).

| Component | % by weight |
|---|---|
| Ludox ® SM | 27.3 |
| water | 15.8 |
| Bentonite clay thixotrope | 0.2 |
| Zinc dust | 48.2 |
| Satintone | 8.6 |

A primer was prepared by mixing the silica sol with water and thixotrope and the resulting binder was mixed with the pigments just before application to the steel, as is usual with zinc silicate coatings. The obtained primer coating was applied to 15 cm×10 cm steel panels at a dry film thickness of 15–20 μm. The primer was allowed to dry at 30° C., 30% RH in an air-flow of 0.5 m/s and when touch dry the panels were sprayed on-line with 0.3 g of various solutions. The treated coating was allowed to dry at 25° C., 75% RH and was tested for the physical properties 10 minutes and 1 hour after application of the various solutions. The results of the tests are shown in Table 8A and 8B.

TABLE 8A

| | | Mechanical properties 10 minutes after treatment | | |
|---|---|---|---|---|
| Example No. | additive and concentration | Double rubs Dry/Wet | Pencil Hardness | Cross-hatch Adhesion |
| 27a | 5% Zinc sulphate | >>100/27–45 | 3–4H | 3 |
| 27b | 2% Aluminium sulphate | >>100/50–100 | 2H | 1 |

TABLE 8A-continued

Mechanical properties 10 minutes after treatment

| Example No. | additive and concentration | Double rubs Dry/Wet | Pencil Hardness | Cross-hatch Adhesion |
|---|---|---|---|---|
| 27c | 5% TMOS (pH 2) | >>100/45–70 | H | 1 |
| 27d | 5% Amino silane A1120 | >>100/19–31 | HB | 0 |

TABLE 8B

Mechanical properties 1 hour after treatment

| Example No. | additive and concentration | Double rubs Dry/Wet | Pencil Hardness | Cross-hatch Adhesion |
|---|---|---|---|---|
| 27a | 5% Zinc sulphate | >>100/>>100 | 5H | 4–5 |
| 27b | 2% Aluminium sulphate | >>100/>>100 | 4–5H | 0–4 |
| 27c | 5% TMOS (pH 2) | >>100/>>100 | 3H | 1–2 |
| 27d | 5% Amino silane A1120 | >>100/30–50 | H | 0 |

Example 28

A primer coating of solids concentration 28% by volume was prepared from the following ingredients. The primer coating had a pigment volume concentration of 74.6%, which is 1.3 times the critical pigment volume concentration ($\lambda$=1.3).

| Component | % by weight |
|---|---|
| Ludox ® SM | 22.0 |
| XZ 94770 | 1.5 |
| water | 19.1 |
| Bentonite clay thixotrope | 0.2 |
| Zinc dust | 48.6 |
| Satintone | 8.6 |

A primer was prepared by mixing the silica sol with water and thixotrope and the resulting binder was mixed with the pigments just before application to the steel, as is usual with zinc silicate coatings. The obtained primer coating was applied to 15 cm×10 cm steel panels at a dry film thickness of 15–20 μm. The primer was allowed to dry at 30° C., 30% RH in an air-flow of 0.5 m/s and when touch dry the panels were sprayed on-line with 0.3 g of various solutions. The treated coating was allowed to dry at 25° C., 75% RH and was tested for the physical properties 10 minutes and 1 hour after application of the various solutions. The results of the tests are shown in Table 9A and 9B.

TABLE 9A

Mechanical properties 10 minutes after treatment

| Example No. | additive and concentration | Double rubs Dry/Wet | Pencil Hardness | Cross-hatch Adhesion |
|---|---|---|---|---|
| 28a | 5% Zinc sulphate | >>100/60–100 | 6H | 4–5 |
| 28b | 2% Aluminium sulphate | >>100/35–70 | 5H | 3–4 |
| 28c | 5% TMOS (pH 2) | >>100/19–31 | H | 3 |
| 28d | 5% Amino silane A1120 | >>100/14–22 | 2H | 2 |

TABLE 9B

Mechanical properties 1 hour after treatment

| Example No. | additive and concentration | Double rubs Dry/Wet | Pencil Hardness | Cross-hatch Adhesion |
|---|---|---|---|---|
| 28a | 5% Zinc sulphate | >>100/>>100 | 6H | 5 |
| 28b | 2% Aluminium sulphate | >>100/>>100 | 6H | 3–4 |
| 28c | 5% TMOS (pH 2) | >>100/35–50 | 4H | 3–4 |
| 28d | 5% Amino silane A1120 | >>100/35–40 | 3H | 2–3 |

Example 29

A primer coating of solids concentration 28% by volume was prepared from the following ingredients. The primer coating had a pigment volume concentration of 68.4%, which is 1.2 times the critical pigment volume concentration ($\lambda$=1.2).

| Component | % by weight |
|---|---|
| Ludox ® SM | 27.6 |
| XZ 94770 | 1.8 |
| water | 15.1 |
| Bentonite clay thixotrope | 0.2 |
| Zinc dust | 48.9 |
| Satintone | 6.4 |

A primer was prepared by mixing the silica sol with water and thixotrope and the resulting binder was mixed with the pigments just before application to the steel, as is usual with zinc silicate coatings. The obtained primer coating was applied to 15 cm×10 cm steel panels at a dry film thickness of 15–20 μm. The primer was allowed to dry at 30° C., 30% RH in an air-flow of 0.5 m/s and when touch dry the panels were sprayed on-line with 0.3 g of various solutions. The treated coating was allowed to dry at 25° C., 75% RH and was tested for the physical properties 10 minutes and 1 hour after application of the various solutions. The results of the tests are shown in Table 10A and 10B.

TABLE 10A

Mechanical properties 10 minutes after treatment

| Example No. | additive and concentration | Double rubs Dry/Wet | Pencil Hardness | Cross-hatch Adhesion |
|---|---|---|---|---|
| 29a | 5% Zinc sulphate | >>100/>>100 | 6H | 4–5 |
| 29b | 2% Aluminium sulphate | >>100/>>100 | 2–5H | 1–2 |
| 29c | 5% TMOS (pH 2) | >>100/60–100 | 3H | 3–4 |
| 29d | 5% Amino silane A1120 | >>100/35–60 | H–2H | 1–2 |

TABLE 10B

|  |  | Mechanical properties 1 hour after treatment | | |
|---|---|---|---|---|
| Example No. | additive and concentration | Double rubs Dry/Wet | Pencil Hardness | Cross-hatch Adhesion |
| 29a | 5% Zinc sulphate | >>100/>>100 | 6H | 4–5 |
| 29b | 2% Aluminium sulphate | >>100/>>100 | 2–5H | 2–3 |
| 29c | 5% TMOS (pH 2) | >>100/>>100 | 3H | 3–4 |
| 29d | 5% Amino silane A1120 | >>100/>100 | H–2H | 1–2 |

Example 30

A primer coating of solids concentration 28% by volume was prepared from the following ingredients. The primer coating had a pigment volume concentration of 71.5%, which is 1.4 times the critical pigment volume concentration ($\lambda=1.4$).

| Component | % by weight |
|---|---|
| Ludox ® SM | 24.7 |
| XZ 94770 | 1.6 |
| water | 17.2 |
| Bentonite clay thixotrope | 0.2 |
| Zinc dust | 48.7 |
| Huber 90C | 7.6 |

A primer was prepared by mixing the silica sol with water and thixotrope and the resulting binder was mixed with the pigments just before application to the steel, as is usual with zinc silicate coatings. The obtained primer coating was applied to 15 cm×10 cm steel panels at a dry film thickness of 15–20 μm. The primer was allowed to dry at 30° C., 30% RH in an air-flow of 0.5 m/s and when touch dry the panels were sprayed on-line with 0.3 g of various solutions. The treated coating was allowed to dry at 25° C., 75% RH and was tested for the physical properties 10 minutes and 1 hour after application of the various solutions. The results of the tests are shown in Table 11A and 11B.

TABLE 11A

|  |  | Mechanical properties 10 minutes after treatment | | |
|---|---|---|---|---|
| Example No. | additive and concentration | Double rubs Dry/Wet | Pencil Hardness | Cross-hatch Adhesion |
| 30a | 5% Zinc sulphate | >>100/>>100 | 3H | 5 |
| 30b | 2% Aluminium sulphate | >>100/>>100 | 2–3H | 4–5 |
| 30c | 5% TMOS (pH 2) | >>100/>>100 | 4–6H | 3–4 |
| 30d | 5% Amino silane A1120 | >>100/>>100 | 2–4H | 4 |

TABLE 11B

|  |  | Mechanical properties 1 hour after treatment | | |
|---|---|---|---|---|
| Example No. | additive and concentration | Double rubs Dry/Wet | Pencil Hardness | Cross-hatch Adhesion |
| 30a | 5% Zinc sulphate | >>100/>>100 | 4–5H | 5 |
| 30b | 2% Aluminium sulphate | >>100/>>100 | 6H | 4–5 |

TABLE 11B-continued

|  |  | Mechanical properties 1 hour after treatment | | |
|---|---|---|---|---|
| Example No. | additive and concentration | Double rubs Dry/Wet | Pencil Hardness | Cross-hatch Adhesion |
| 30c | 5% TMOS (pH 2) | >>100/>>100 | 3H | 3–4 |
| 30d | 5% Amino silane A1120 | >>100/>100 | 3H | 3–4 |

Example 31

A primer coating of solids concentration 28% by volume was prepared from the following ingredients. The primer coating had a pigment volume concentration of 76.0%, which is 1.4 times the critical pigment volume concentration ($\lambda=1.4$).

| Component | % by weight |
|---|---|
| Ludox ® SM | 20.7 |
| XZ 94770 | 1.3 |
| water | 19.9 |
| Bentonite clay thixotrope | 0.2 |
| Zinc dust | 48.3 |
| Huber 90C | 6.1 |
| 'Molywhite' molybdate pigment | 3.5 |

A primer was prepared by mixing the silica sol with water and thixotrope and the resulting binder was mixed with the pigments just before application to the steel, as is usual with zinc silicate coatings. The obtained primer coating was applied to 15 cm×10 cm steel panels at a dry film thickness of 15–20 μm. The primer was allowed to dry at 30° C., 30% RH in an air-flow of 0.5 m/s and when touch dry the panels were sprayed on-line with 0.3 g of various solutions. The treated coating was allowed to dry at 25° C., 75% RH and was tested for the physical properties 10 minutes and 1 hour after application of the various solutions. The results of the tests are shown in Table 12A and 12B.

TABLE 12A

|  |  | Mechanical properties 10 minutes after treatment | | |
|---|---|---|---|---|
| Example No. | additive and concentration | Double rubs Dry/Wet | Pencil Hardness | Cross-hatch Adhesion |
| 31a | 5% Zinc sulphate | >>100/30–70 | 4H | 3–4 |
| 31b | 2% Aluminium sulphate | >>100/30–60 | 2–3H | 3 |
| 31c | 5% TMOS (pH 2) | >>100/60–75 | 2H | 2 |
| 31d | 5% Amino silane A1120 | >>100/30–60 | 2H | 1 |

TABLE 12B

|  |  | Mechanical properties 1 hour after treatment | | |
|---|---|---|---|---|
| Example No. | additive and concentration | Double rubs Dry/Wet | Pencil Hardness | Cross-hatch Adhesion |
| 31a | 5% Zinc sulphate | >>100/>>100 | 6H | 5 |
| 31b | 2% Aluminium sulphate | >>100/>>100 | 3H | 4–5 |
| 31c | 5% TMOS (pH 2) | >>100/>>100 | 5H | 4 |

TABLE 12B-continued

| | | Mechanical properties 1 hour after treatment | | |
|---|---|---|---|---|
| Example No. | additive and concentration | Double rubs Dry/Wet | Pencil Hardness | Cross-hatch Adhesion |
| 31d | 5% Amino silane A1120 | >>100/>>100 | 4H | 3 |

Examples 32 to 40

To illustrate the effect of post-treatment with film strengthening solution under typical shop-primer-line conditions, the primer coating of Example 1 was drawn down onto steel panels, dried at 30° C./30% RH/0.5 m/s. When touch dry, the panels were sprayed with various solutions and stored at 20° C./50% RH. The mechanical properties were measured 1 hour and 1 day after spraying with the solutions. The results in terms of mechanical properties are given in Tables 13A (1 hour) and 13B (1 day).

TABLE 13A

| | | Mechanical properties 1 hour after treatment | | |
|---|---|---|---|---|
| Example No. | additive and concentration | Double rubs Dry/Wet | Pencil Hardness | Cross-hatch Adhesion |
| 32 | 5% Potassium silicate | >>100/>>100 | 5H | 4 |
| 33 | 5% Amino silane A1120 | >>100/75 | 2H | 0 |
| 34 | 5% TMOS (pH 2) | >>100/50 | 5H | 2–3 |
| 35 | 5% TEOS (pH 2) | >>100/50 | 2H | 2 |
| 36 | 5% Zinc sulphate | >>100/40 | 5H | 3–4 |
| 37 | 2.5% Aluminium sulphate | >>100/50 | 4H | 1 |
| 38 | 2% Ammonium sulphate | >>100/>>100 | 4H | 2 |
| 39 | 5.8% Cerium(IV) sulphate | >>100/>>100 | 7H | 4 |
| 40 | 2% Aluminium nitrate | >>100/70 | 6H | 0 |

TABLE 13B

| | | Mechanical properties 1 day after treatment | | |
|---|---|---|---|---|
| Example No. | additive and concentration | Double rubs Dry/Wet | Pencil Hardness | Cross-hatch Adhesion |
| 32 | 5% Potassium silicate | >>100/>>100 | 8H | 4 |
| 33 | 5% Amino silane A1120 | >>100/>>100 | 3H | 1 |
| 34 | 5% TMOS (pH 2) | >>100/>>100 | 7H | 3–4 |
| 35 | 5% TEOS (pH 2) | >>100/>>100 | 6H | 2 |
| 36 | 5% Zinc sulphate | >>100/>>100 | 5H | 3–4 |
| 37 | 2.5% Aluminium sulphate | >>100/>>100 | 6H | 2 |
| 38 | 2% Ammonium sulphate | >>100/>>100 | 6H | 3 |
| 39 | 5.8% Cerium(IV) sulphate | >>100/>>100 | 7H | 4 |
| 40 | 2% Aluminium nitrate | >>100/>100 | 6H | 1 |

Examples 41–48

Coatings of the composition described in Example 1 were HVLP spray applied on shot blasted 15 cm×10 cm steel panels and treated with a film strengthening solution as soon as they were touch dry. After 7 days storage at room temperature the primer was top-coated with 150 μm dft of a commercial epoxy-amine anticorrosive primer. After allowing the epoxy-amine primer to cure for 7 days, the panels were immersed in 40° C. fresh water and 40° C. sea water and inspected for blistering after 4 months immersion. Control/comparison coatings comprising a commercial solvent borne zinc silicate shop primer (Example 47) and a waterborne zinc silicate based shop primer based on a alkali silicate binder, $SiO_2/K_2O$ mole ratio 3.9:1 (Example 48) were also tested. The results are shown in Table 14 below.

TABLE 14

| | | Blistering | |
|---|---|---|---|
| Example No. | additive and concentration | 40° C. fresh water | 40° C. sea water |
| 41 | 0.3 g of 5% Zinc sulphate | + | + |
| 42 | 0.9 g of 5% Zinc sulphate | + | + |
| 43 | 0.3 g of 2.5% Aluminium sulphate | + | + |
| 44 | 0.9 g of 2.5% Aluminium sulphate | + | + |
| 45 | 0.3 g of 5% A1120 | + | + |
| 46 | 0.3 g of 5% TMOS (pH 2) | + | + |
| 47* | (solventborne shop primer) | + | + |
| 48* | (waterborne shop primer, $SiO_2/K_2O$ mole ratio 3.9:1) | − | − |

*Comparative example
+ No blistering
− Severe blistering

The invention claimed is:

1. A process for primer coating of steel comprising:
    coating the steel with a primer coating comprising a silica binder, wherein the binder comprises an aqueous silica sol having a particle size in the range 3 to 100 nm and having a $SiO_2/M_2O$ mole ratio, where M represents total alkali metal and ammonium ions, of at least 25:1; and
    after the primer coating has dried to the extent that it is touch dry, treating it with a film strengthening solution.

2. A process according to claim 1 wherein the touch dry primer coating is sprayed with the film strengthening solution.

3. A process according to claim 1 wherein the binder comprises an aqueous solution stabilized by a siliconate substituted by at least one anionic group of lower pKa than silicic acid, having a pH of 7 to 10.5 prepared by lowering the pH of a solution of silicate and siliconate by ion exchange.

4. A process according to claim 1 wherein the primer coating further comprises zinc powder and/or a zinc alloy.

5. A process according to claim 1 wherein the primer coating further comprises an organic resin.

6. A process according to claim 1 wherein all components of the coating composition are added and thoroughly mixed shortly before application.

7. A process according to claim 1 wherein the touch dry primer coating is treated with a solution of a silicate or alkoxysilane.

8. A process according to claim 1 wherein the solution is applied to the touch dry primer coated steel at 0.005–0.2 liters per square meter primer coated surface.

9. A process according to claim 1 wherein the touch dry primer coating is treated with an aqueous solution of an inorganic salt of concentration at least 0.01M.

10. A process according to claim 1 wherein the primer coating of the steel, drying of the primer coating until it is touch dry and application of the treatment solution are carried out successively in an on-line process.

11. A process according to claim 1 wherein the primer coating is dried at a temperature of 10–60° C. in a forced air flow.

12. A process according to claim 1 wherein the binder further comprises an alkali metal silicate.

13. A method of treating steel primer comprising: spraying an aqueous solution of an inorganic salt of concentration at least 0.01 M on steel that has previously been coated with a primer coating comprising an aqueous silica sol binder having a particle size in the range 3 to 100 nm and a $SiO_2/M_2O$ mole ratio, where M represents total alkali metal and ammonium ions, of at least 25:1.

14. A method according to claim 13 wherein the binder further comprises an alkali metal silicate.

15. A method of treating steel primer comprising: spraying a silicate, an alkoxysilane, or an acyloxysilane solution on steel that has previously been coated with a primer coating comprising an aqueous silica sol binder having a particle size in the range of 3 to 100 nm and a $SiO_2/M_2O$ mole ratio, where M represents total alkali metal and ammonium ions, of at least 25:1.

16. A method according to claim 15 wherein the binder further comprises an alkali metal silicate.

17. A process for primer coating of steel comprising:

coating the steel with a primer coating comprising a silica binder and zinc powder and/or a zinc alloy, wherein the binder comprises an aqueous silica sol having a particle size in the range 3 to 100 nm and having a $SiO_2/M_2O$ mole ratio, where M represents total alkali metal and ammonium ions, of at least 25:1; and after the primer coating has dried to the extent that it is touch dry, treating it with a film strengthening solution.

18. A process for primer coating of steel comprising:

coating the steel with a primer coating comprising a silica binder and zinc powder and/or a zinc alloy, wherein the binder comprises an aqueous silica sol having a particle size in the range 3 to 100 nm and having a $SiO_2/M_2O$ mole ratio, where M represents total alkali metal and ammonium ions, of at least 25:1; and spraying an aqueous solution of an inorganic salt having a concentration of at least 0.01M on the steel coated with the primer coating.

19. A process for primer coating of steel comprising:

coating the steel with a primer coating comprising a silica binder and zinc powder and/or a zinc alloy, wherein the binder comprises an aqueous silica sol having a particle size in the range 3 to 100 nm and having a $SiO_2/M_2O$ mole ratio, where M represents total alkali metal and ammonium ions, of at least 25:1; and spraying a silicate or alkoxysilane solution on the steel coated with the primer coating.

* * * * *